US010319107B2

(12) United States Patent
Babenko et al.

(10) Patent No.: US 10,319,107 B2
(45) Date of Patent: *Jun. 11, 2019

(54) REMOTE DETERMINATION OF QUANTITY STORED IN CONTAINERS IN GEOGRAPHICAL REGION

(71) Applicant: Orbital Insight, Inc., Mountain View, CA (US)

(72) Inventors: Boris Aleksandrovich Babenko, Mountain View, CA (US); Alexander Bogdanov Avtanski, San Jose, CA (US); Jason D. Lohn, Los Gatos, CA (US)

(73) Assignee: Orbital Insight, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,896

(22) Filed: Jan. 26, 2018

(65) Prior Publication Data

US 2018/0182122 A1 Jun. 28, 2018

Related U.S. Application Data

(63) Continuation of application No. 15/470,563, filed on Mar. 27, 2017, now Pat. No. 9,934,591.
(Continued)

(51) Int. Cl.
*G06T 7/62* (2017.01)
*G06K 9/00* (2006.01)
(Continued)

(52) U.S. Cl.
CPC ............ *G06T 7/62* (2017.01); *G06K 9/00637* (2013.01); *G06K 9/2054* (2013.01);
(Continued)

(58) Field of Classification Search
CPC ............ G06K 9/00637; G06K 9/2054; G06K 9/4604; G06K 9/6202; G06K 9/6218;
(Continued)

(56) References Cited

U.S. PATENT DOCUMENTS 5,705,733 A 1/1998 Jannotta
5,943,164 A 8/1999 Rao
(Continued)

FOREIGN PATENT DOCUMENTS

AU 2004286209 A1 5/2005
AU 2005330673 A1 10/2006
(Continued)

OTHER PUBLICATIONS

Boekaerts, P. et al., "Potential Role of Very High Resolution Optical Satellite Image Pre-Processing for Product Extraction," Pre-Processing of VHR Optical Satellite Imagery, pp. 100-110.
(Continued)

*Primary Examiner* — Mekonen T Bekele
(74) *Attorney, Agent, or Firm* — Fenwick & West LLP

(57) ABSTRACT

Disclosed is a method and system for processing images from an aerial imaging device. An image of an object of interest is received from the aerial imaging device. A parameter vector is extracted from the image. Image analysis is performed on the image to determine a height and a width of the object of interest. Idealized images of the object of interest are generated using the extracted parameter vector, the determined height, and the determined width of the object of interest. Each idealized image corresponds to a distinct filled volume of the object of interest. The received image of the object of interest is matched to each idealized image to determine a filled volume of the object of interest. Information corresponding to the determined filled volume of the object of interest is transmitted to a user device.

20 Claims, 11 Drawing Sheets

Related U.S. Application Data

(60) Provisional application No. 62/320,387, filed on Apr. 8, 2016.

(51) Int. Cl.

| | | |
|---|---|---|
| *G06K 9/20* | (2006.01) | |
| *G06K 9/46* | (2006.01) | |
| *G06K 9/62* | (2006.01) | |
| *G06K 9/66* | (2006.01) | |
| *G06T 7/507* | (2017.01) | |
| *G06T 7/586* | (2017.01) | |
| *G06T 7/55* | (2017.01) | |
| *G06T 7/73* | (2017.01) | |
| *G06T 7/246* | (2017.01) | |
| *G06N 20/00* | (2019.01) | |

(52) U.S. Cl.
CPC ......... *G06K 9/4604* (2013.01); *G06K 9/4628* (2013.01); *G06K 9/6202* (2013.01); *G06K 9/6218* (2013.01); *G06K 9/6255* (2013.01); *G06K 9/6256* (2013.01); *G06K 9/6271* (2013.01); *G06K 9/66* (2013.01); *G06T 7/248* (2017.01); *G06T 7/251* (2017.01); *G06T 7/507* (2017.01); *G06T 7/55* (2017.01); *G06T 7/586* (2017.01); *G06T 7/74* (2017.01); *G06T 7/75* (2017.01); *G06N 20/00* (2019.01); *G06T 2207/10024* (2013.01); *G06T 2207/10032* (2013.01); *G06T 2207/10036* (2013.01); *G06T 2207/10048* (2013.01); *G06T 2207/20061* (2013.01); *G06T 2207/20076* (2013.01); *G06T 2207/20081* (2013.01)

(58) Field of Classification Search
CPC ........ G06K 9/6256; G06K 9/66; G06T 7/248; G06T 7/251; G06T 7/507; G06T 7/55; G06T 7/586; G06T 7/62; G06T 7/74; G06T 7/75; G06T 2207/10032
See application file for complete search history.

(56) References Cited

U.S. PATENT DOCUMENTS

| | | | |
|---|---|---|---|
| 5,973,770 A | 10/1999 | Carter et al. | |
| 6,064,759 A | 5/2000 | Buckley et al. | |
| 6,714,000 B2 | 3/2004 | Staats | |
| 6,771,058 B2 | 8/2004 | Lapinski et al. | |
| 6,782,122 B1 | 8/2004 | Kline et al. | |
| 6,956,364 B2 | 10/2005 | Saats | |
| 7,088,090 B2 | 8/2006 | Saats | |
| 7,212,670 B1 | 5/2007 | Rousselle et al. | |
| 7,274,996 B2 | 9/2007 | Lapinski et al. | |
| 7,376,522 B2 | 5/2008 | Lapinski et al. | |
| 7,398,168 B2 | 7/2008 | Lapinski et al. | |
| 7,400,770 B2 * | 7/2008 | Keaton ................ | G06K 9/0063 382/191 |
| 7,571,028 B2 | 8/2009 | Lapinski et al. | |
| 7,706,990 B2 | 4/2010 | Herzig | |
| 7,742,897 B2 | 6/2010 | Herzig | |
| 7,809,621 B2 | 10/2010 | Herzig | |
| 7,848,595 B2 | 12/2010 | Ayres et al. | |
| 8,170,282 B1 | 5/2012 | Roskovensky | |
| 8,190,395 B2 | 5/2012 | Peleg et al. | |
| 8,254,640 B2 | 8/2012 | Ma | |
| 8,280,652 B2 | 10/2012 | Syracuse et al. | |
| 8,442,307 B1 | 5/2013 | Anati et al. | |
| 8,473,227 B2 | 6/2013 | Olson et al. | |
| 8,504,325 B2 | 8/2013 | Kerrigan et al. | |
| 8,532,336 B2 | 9/2013 | Bobbitt et al. | |
| 8,594,375 B1 | 11/2013 | Padwick | |
| 8,655,070 B1 | 2/2014 | Yang et al. | |
| 8,676,520 B2 | 3/2014 | Olson et al. | |
| 8,717,434 B2 | 5/2014 | Alphenaar et al. | |
| 8,725,459 B2 | 5/2014 | Herzig et al. | |
| 8,738,328 B2 | 5/2014 | Herzig et al. | |
| 8,842,874 B1 | 9/2014 | Alphenaar et al. | |
| 8,862,432 B2 | 10/2014 | Herzig et al. | |
| 8,972,221 B2 | 3/2015 | Kerrigan et al. | |
| 8,972,273 B1 | 3/2015 | Abrishamain et al. | |
| 9,031,287 B2 | 5/2015 | Ma | |
| 9,117,310 B2 | 8/2015 | Coene et al. | |
| 9,230,333 B2 * | 1/2016 | Robinson .............. | G06T 7/2006 |
| 9,292,922 B2 | 3/2016 | Facchin et al. | |
| 9,390,621 B2 | 7/2016 | Cuende Alonso | |
| 9,807,365 B2 * | 10/2017 | Cansizoglu ............ | G06T 7/344 |
| 9,875,430 B1 | 1/2018 | Keisler et al. | |
| 9,934,591 B2 * | 4/2018 | Babenko .............. | G06K 9/4628 |
| 10,013,774 B2 | 7/2018 | Estrada et al. | |
| 10,049,492 B2 | 8/2018 | Babahajiani et al. | |
| 10,068,129 B2 | 9/2018 | Brandt et al. | |
| 10,083,354 B2 | 9/2018 | Aschenbeck | |
| 10,089,554 B1 | 10/2018 | Chartrand | |
| 2001/0040446 A1 | 11/2001 | Lapinski et al. | |
| 2002/0101231 A1 | 8/2002 | Staats | |
| 2003/0098683 A1 | 5/2003 | Lapinski et al. | |
| 2003/0226919 A1 | 12/2003 | Brock et al. | |
| 2004/0021455 A1 | 2/2004 | Staats | |
| 2004/0263149 A1 | 12/2004 | Staats | |
| 2005/0027636 A1 | 2/2005 | Gilbert et al. | |
| 2005/0086012 A1 | 4/2005 | Lapinski et al. | |
| 2005/0100220 A1 * | 5/2005 | Keaton ................ | G06K 9/0063 382/191 |
| 2005/0162148 A1 | 7/2005 | Staats | |
| 2005/0263626 A1 | 12/2005 | Brock et al. | |
| 2006/0235574 A1 | 10/2006 | Lapinski et al. | |
| 2007/0052493 A1 | 3/2007 | Lapinski et al. | |
| 2007/0158479 A1 | 7/2007 | Westerman et al. | |
| 2007/0195089 A1 * | 8/2007 | Furukado ................ | G06T 17/05 345/426 |
| 2007/0294041 A1 | 12/2007 | Lapinski et al. | |
| 2008/0195561 A1 | 8/2008 | Herzig | |
| 2008/0260237 A1 * | 10/2008 | Savolainen .......... | G06K 9/0063 382/154 |
| 2008/0270276 A1 | 10/2008 | Herzig | |
| 2009/0099915 A1 | 4/2009 | Herzig | |
| 2009/0112758 A1 | 4/2009 | Herzig | |
| 2009/0144000 A1 | 6/2009 | Herzig | |
| 2009/0284249 A1 | 11/2009 | Syracuse et al. | |
| 2010/0175042 A1 * | 7/2010 | Tirapu Azpiroz ........ | G03F 1/36 716/53 |
| 2010/0219983 A1 | 9/2010 | Peleg et al. | |
| 2010/0271222 A1 | 10/2010 | Kerrigan et al. | |
| 2010/0318297 A1 | 12/2010 | Herzig et al. | |
| 2011/0026810 A1 | 2/2011 | Hu | |
| 2012/0032960 A1 | 2/2012 | Kameyama | |
| 2012/0035887 A1 * | 2/2012 | Augenbraun .......... | G06T 15/06 703/1 |
| 2012/0069012 A1 | 3/2012 | Facchin et al. | |
| 2012/0191351 A1 | 7/2012 | Kerrigan et al. | |
| 2012/0206595 A1 | 8/2012 | Alphenaar et al. | |
| 2012/0209440 A1 | 8/2012 | Kerrigan et al. | |
| 2012/0226450 A1 | 9/2012 | Olson et al. | |
| 2013/0060540 A1 | 3/2013 | Frahm et al. | |
| 2013/0064420 A1 | 3/2013 | Amin et al. | |
| 2013/0152998 A1 | 6/2013 | Herzig et al. | |
| 2013/0163811 A1 | 6/2013 | Oelke | |
| 2013/0166211 A1 | 6/2013 | Kerrigan et al. | |
| 2013/0166266 A1 | 6/2013 | Herzig et al. | |
| 2013/0261997 A1 | 10/2013 | Olson et al. | |
| 2013/0289791 A1 | 10/2013 | Kerrigan et al. | |
| 2013/0336535 A1 | 12/2013 | Bobbitt et al. | |
| 2014/0180637 A1 | 6/2014 | Kerrigan et al. | |
| 2014/0188410 A1 | 7/2014 | Kerrigan et al. | |
| 2014/0200936 A1 | 7/2014 | Alphenaar et al. | |
| 2014/0278107 A1 | 9/2014 | Kerrigan et al. | |
| 2014/0278108 A1 | 9/2014 | Kerrigan et al. | |
| 2015/0010200 A1 | 1/2015 | Kawahara et al. | |
| 2015/0022656 A1 | 1/2015 | Carr et al. | |
| 2015/0065178 A1 | 3/2015 | Beauregard et al. | |
| 2015/0309207 A1 | 10/2015 | Kerrigan et al. | |
| 2015/0317529 A1 | 11/2015 | Zhou et al. | |

(56) References Cited

U.S. PATENT DOCUMENTS

| | | |
|---|---|---|
| 2015/0356868 A1 | 12/2015 | Cuende Alonso |
| 2015/0371520 A1 | 12/2015 | DeLean |
| 2016/0019482 A1 | 1/2016 | Venhoff et al. |
| 2016/0026740 A1 | 1/2016 | Herzig et al. |
| 2016/0068173 A1 | 3/2016 | Fuchs et al. |
| 2016/0280397 A1* | 9/2016 | Christ .................... B64D 47/08 |
| 2016/0343124 A1 | 11/2016 | Sundheimer et al. |
| 2017/0061249 A1 | 3/2017 | Estrada et al. |
| 2017/0061625 A1 | 3/2017 | Estrada et al. |
| 2017/0147901 A1 | 5/2017 | Klein et al. |
| 2017/0161878 A1* | 6/2017 | Omer ...................... G06T 5/002 |
| 2017/0293800 A1* | 10/2017 | Babenko .............. G06K 9/4628 |
| 2017/0372120 A1 | 12/2017 | Revell et al. |
| 2018/0012060 A1 | 1/2018 | Revell et al. |
| 2018/0053054 A1 | 2/2018 | Schultz et al. |
| 2018/0114301 A1 | 4/2018 | Tseng |
| 2018/0150677 A1 | 5/2018 | Aschenbeck |
| 2018/0157911 A1 | 6/2018 | Lo et al. |
| 2018/0181833 A1 | 6/2018 | Yin et al. |
| 2018/0189975 A1 | 7/2018 | Inada et al. |
| 2018/0232557 A1 | 8/2018 | Chang et al. |
| 2018/0260669 A1 | 9/2018 | Konishi |
| 2018/0266887 A1 | 9/2018 | Frank et al. |
| 2018/0283953 A1 | 10/2018 | Frank et al. |

FOREIGN PATENT DOCUMENTS

| | | |
|---|---|---|
| AU | 2005336125 A1 | 3/2007 |
| AU | 2012217632 B2 | 9/2013 |
| AU | 2012223240 B2 | 9/2013 |
| BR | PI0415549 A | 12/2006 |
| BR | PI0716882 A2 | 10/2013 |
| CA | 2406444 A1 | 10/2001 |
| CA | 2543453 A1 | 5/2005 |
| CA | 2604475 A1 | 10/2006 |
| CA | 2827314 A1 | 8/2012 |
| CA | 2828709 A1 | 9/2012 |
| CN | 1871493 A | 11/2006 |
| CN | ZL200480031012.5 | 11/2006 |
| CN | 101408279 A | 4/2009 |
| CN | ZL200810149959 | 4/2009 |
| CN | 101529259 A | 9/2009 |
| CN | 103477359 A | 12/2013 |
| CN | 103477364 A | 12/2013 |
| DE | 60128803.3 T2 | 1/2008 |
| DK | 1297347 T3 | 10/2007 |
| DK | 1922550 T3 | 3/2014 |
| EP | 1297347 A1 | 4/2003 |
| EP | 1678465 A2 | 7/2006 |
| EP | 1875322 A1 | 1/2008 |
| EP | 1922550 A1 | 5/2008 |
| EP | 2059823 A2 | 5/2009 |
| EP | 2676232 A2 | 12/2013 |
| EP | 2681593 A2 | 1/2014 |
| ES | 2287121 T3 | 12/2007 |
| ES | 2442224 T3 | 2/2014 |
| IN | 7905/DELNP/2013 A | 12/2014 |
| IN | 3668/KOLNP/2015 A | 3/2016 |
| JP | 2007-036909 A | 2/2007 |
| JP | 2007-509347 A | 4/2007 |
| JP | 2008-537468 A | 9/2008 |
| JP | 2009-508459 A | 2/2009 |
| JP | 4796144 B2 | 10/2011 |
| JP | 4903573 B2 | 3/2012 |
| JP | 2012-239378 A | 12/2012 |
| JP | 5425978 B2 | 2/2014 |
| JP | 2014-511527 A | 5/2014 |
| MX | 2013009938 A | 12/2013 |
| MX | 2013009414 A | 1/2014 |
| NO | 20062296 A | 5/2006 |
| RU | 2006118369 A | 12/2007 |
| RU | 2009113018 A | 10/2010 |
| RU | 2437105 | 12/2011 |
| SG | 192799 A1 | 9/2013 |
| SG | 193016 A1 | 10/2013 |
| WO | WO 2000/77535 A1 | 12/2000 |
| WO | WO 2001/79872 A1 | 10/2001 |
| WO | WO 2005/042984 A2 | 5/2005 |
| WO | WO 2006/112839 A1 | 10/2006 |
| WO | WO 2007/030121 A1 | 3/2007 |
| WO | WO 2008/030844 A2 | 3/2008 |
| WO | WO 2008/031029 A2 | 8/2008 |
| WO | WO 2009/156527 A1 | 12/2009 |
| WO | WO 2012/112759 A2 | 8/2012 |
| WO | WO 2012/119054 A2 | 9/2012 |
| WO | WO 2014/043764 A1 | 3/2014 |
| WO | WO 2015/181827 A1 | 12/2015 |
| WO | WO 2016/011158 A1 | 1/2016 |
| WO | WO 2016/040249 A1 | 3/2016 |

OTHER PUBLICATIONS

"MCG 3900 Inventory Management System," L&J Engineering, undated, pp. 96-103.

Sneed, W.A., "Evolution of Melt Pond Volume on the Surface of the Greenland Ice Sheet," Earth Science Faculty Scholarship, The University of Maine, Feb. 14, 2007, Geophysical Research Letters, L03501, 5 pages, vol. 34.

Molinari, M. et al., "Vertical Measurements in Oblique Aerial Imagery",SPRS International Journal of Geo-Information, ISPRS Int. J. Geo-Inf. 2014, 3, 914-928; doi:10.3390/ijgi3030914, pp. 15.

PCT Invitation to Pay Additional Fees, PCT Application No. PCT/US2017/024317, dated May 22, 2017, 2 pages.

PCT International Search Report and Written Opinion, PCT Application No. PCT/US2017/024317, dated Jul. 19, 2017, 15 pages.

Maggiori, E., "Convolutional Neural Networks for Large-Scale Remote-Sensing Image Classification," IEEE Transactions on Geoscience and Remote Sensing, 2017, pp. 1-14.

Vakalopoulou M., "Building Detection in Very High Resolution Multispectral Data with Deep Learning Features," 2015 IEEE International Geoscience and Remote Sensing Symposium (IGARSS), 2015, pp. 1-4.

* cited by examiner

Roof Height (RH) circle position $$\Delta l_v = \frac{RH}{\tan(sat\_elev)}$$

$$RH_x = BC_x + \Delta l_v \sin(sat\_az)$$

$$RH_y = BC_y + \Delta l_v \cos(sat\_az)$$

Internal Shadow (IS) circle position $$\Delta l_s = \frac{TH - RH}{\tan(sun\_elev)}$$

$$IS_x = BC_x + \Delta l_v \sin(sat\_az) - \Delta l_s \sin(sun\_az)$$

$$IS_y = BC_y + \Delta l_v \cos(sat\_az) + \Delta l_s \cos(sun\_az)$$

Top Circle (TC) circle position $$\Delta t_v = \frac{TH}{\tan(sat\_elev)}$$

$$TC_x = BC_x + \Delta t_v \sin(sat\_az)$$

$$TC_y = BC_y + \Delta t_v \cos(sat\_az)$$

Notes: BC = Bottom Circle, sat_az = satellite azimuth angle, sat_elev = satellite elevation angle, sun_az = sun azimuth angle, sun_elev = sun elevation angle

FIG. 8

REMOTE DETERMINATION OF QUANTITY STORED IN CONTAINERS IN GEOGRAPHICAL REGION

CROSS REFERENCE TO RELATED APPLICATION

This application is a Continuation of U.S. application Ser. No. 15/470,563, filed Mar. 27, 2017, which claims the benefit of U.S. Provisional Application No. 62/320,387, filed Apr. 8, 2016, both of which are incorporated by reference in their entirety.

TECHNICAL FIELD

This disclosure relates generally to image processing and, in particular, to determining the quantity stored in remote objects in a geographical area using images captured by an aerial imaging device.

BACKGROUND

Several applications analyze aerial images to identify objects in the images, for example, various objects in aerial images captured by satellites. Analysis of high resolution images can be performed using relatively simple techniques. Obtaining high resolution aerial images typically requires use of large, expensive satellites and results. These satellites typically require a significant amount of resources. For example, such satellites carry sophisticated and expensive equipment such as high spatial resolution cameras, expensive transponders, and advanced computers. Other factors that contribute to the cost associated with expensive imaging satellites are the launch cost and maintenance. Expensive high spatial resolution imaging satellites must be monitored from a ground facility, which requires expensive manpower. These satellites are also susceptible to damage or costly downtimes. The high launch and development costs of expensive imaging satellites leads to a slowdown in the introduction of new or upgraded satellite imagery and communication services for object detection.

Cheaper low spatial resolution imaging satellites may be used for capturing images. However, such satellites and provide unclear images. In low-resolution imagery, objects such as containers or tanks are typically not clearly identifiable and often appear as blobs containing a few adjacent pixels. In other instances, such as in infrared band imagery, the images may be completely invisible to humans.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 8 illustrates a set of example circle projection equations, in accordance with an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments are systems, methods and/or computer program products (e.g., a non-transitory computer readable storage media that stores instructions executable by one or more processing units) for identifying remote objects, such as cylindrical containers or tanks with floating roof structures over large geographic regions (e.g., a country), and determining the filled volume of remote objects.

In one example embodiment, a remote container analysis system may receive an image of an object of interest, such as a cylindrical container or tank with a floating roof structure from an aerial imaging device, such as a satellite, drone, or other aerial configured imaging system. Such tanks are typically found in clusters or "tank farms." The system extracts a parameter vector from the image. The parameter vector may include a parameter describing an elevation angle of the aerial imaging device. The system performs image analysis on the image to determine a height and a width of the object of interest. The system generates idealized image templates of the object of interest using the extracted parameter vector and the determined height and width of the object of interest. Each idealized image corresponds to a distinct filled volume of the object of interest, such as 30%, 70%, etc. The system matches the received image of the object of interest to each idealized image to determine the filled volume of the object of interest by performing a dot product between pixels of the received image and pixels of the idealized image. The system transmits information corresponding to the determined filled volume of the object of interest to a user device.

Example System Environment

Figure 1:
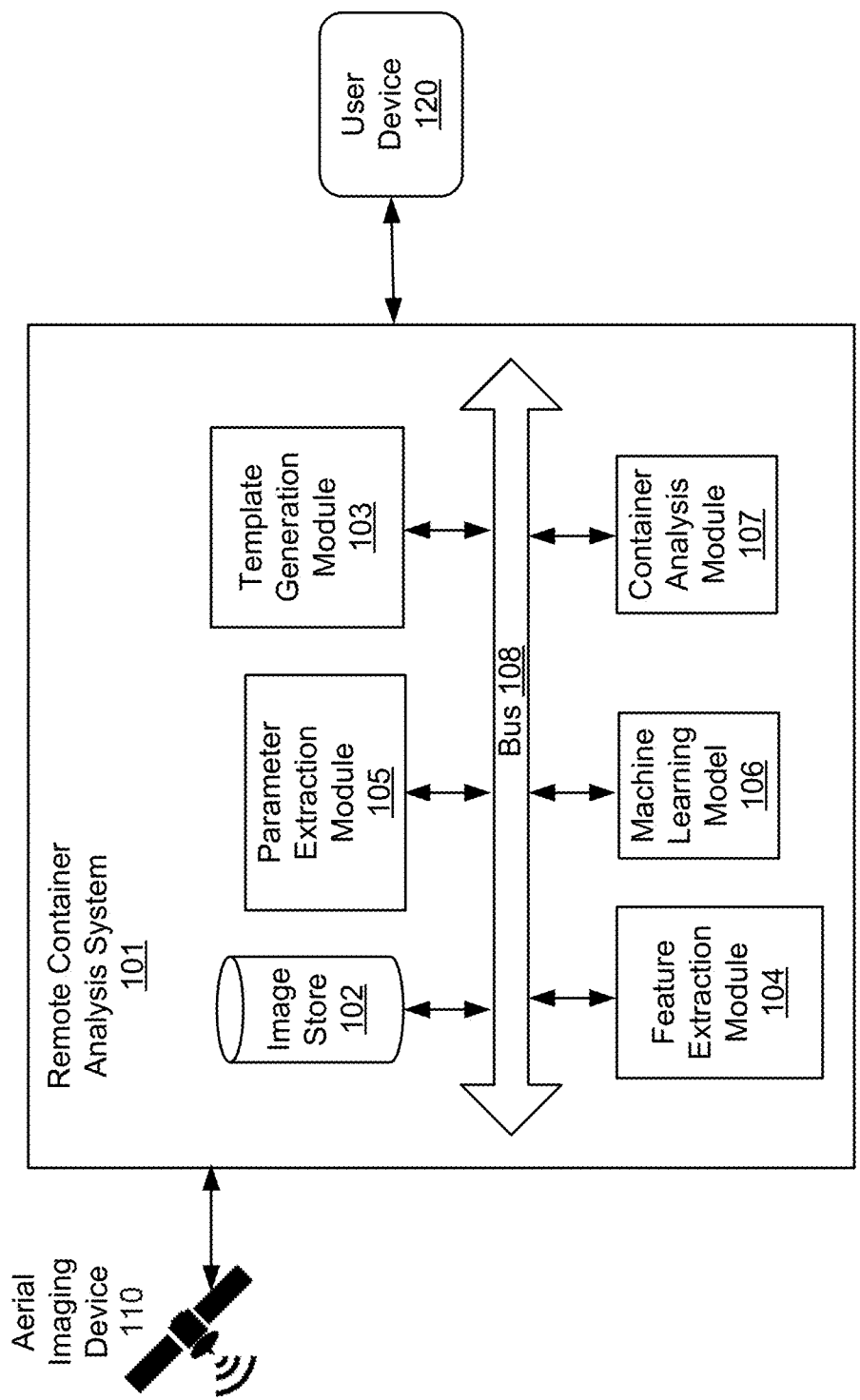
FIG. 1 illustrates a block diagram of an example system environment in which a remote container analysis system operates, in accordance with an embodiment.

Referring now to Figure (FIG. 1, it illustrates a block diagram of an example system environment in which a remote container analysis system 101 operates, in accordance with an embodiment. The example system environment shown in FIG. 1 may include an aerial imaging device 110, the remote container analysis system 101, and a user device 120.

The aerial imaging device 110 shown in FIG. 1 may be a satellite, drone, or other aerial configured imaging system, capable of capturing low resolution images. The images may correspond to the same spectral band or different spectral bands, where a spectral band corresponds to a range of wavelengths of light. Example spectral bands include the red spectral band, the green spectral band, the blue spectral band, the infrared spectral band, and the panchromatic spectral band. It is noted that low resolution images have resolution significantly less (e.g., 15 m per pixel) than high resolution images (e.g., 50 cm per pixel).

The remote container analysis system 101 may contain an image store 102, an optional feature extraction module 104, a machine learning model 106, a container analysis module 107, a parameter extraction module 105, and a template generation module 103. The image store 102 shown in FIG. 1 may store images received from the aerial imaging device 110, as illustrated and described below with reference to FIG. 2. The feature extraction module 104 may optionally extract feature vectors from the images received from the aerial imaging device 110. For example, a feature vector may include aggregate values based on pixel attributes of pixels in the images, as illustrated and described below with reference to FIG. 4. The remote container analysis system 101 transmits the feature vector to the machine learning model 106 to identify objects of interest in the images as illustrated and described below with reference to FIG. 5. The container analysis module 107 may analyze a pattern related to the identified objects of interest in the images, for example, times of capture of images, counts of the images, filled volumes of the images.

The parameter extraction module 105 may extract parameters from the image, for example, a parameter describing an azimuth angle of the aerial imaging device 110, a parameter describing an elevation angle of the sun, and a parameter describing an azimuth angle of the sun. The parameters are used by the template generation module 103 to generate idealized image templates of the object of interest using the extracted parameters, as illustrated and described below with reference to FIG. 9. Each idealized image corresponds to a distinct filled volume of the object of interest, for example, 35%.

The remote container analysis system 101 may interact with the user device 120 shown in FIG. 1. The user device 120 may be a computing device capable of receiving user input as well as transmitting and/or receiving data via a network. In one example embodiment, a user device 120 may be a conventional computer system, such as a desktop or laptop computer. Alternatively, a user device 120 may be a device having computer functionality, such as a personal digital assistant (PDA), a mobile telephone, a smartphone, a tablet, or another suitable device. The remote container analysis system 101 may transmit a visual representation of the object of interest to the user device 120 or output a visual representation of the object of interest to a user interface, for example, through graphical icons, graphical overlays, and other visual indicators.

Example System Architecture

Figure 2:
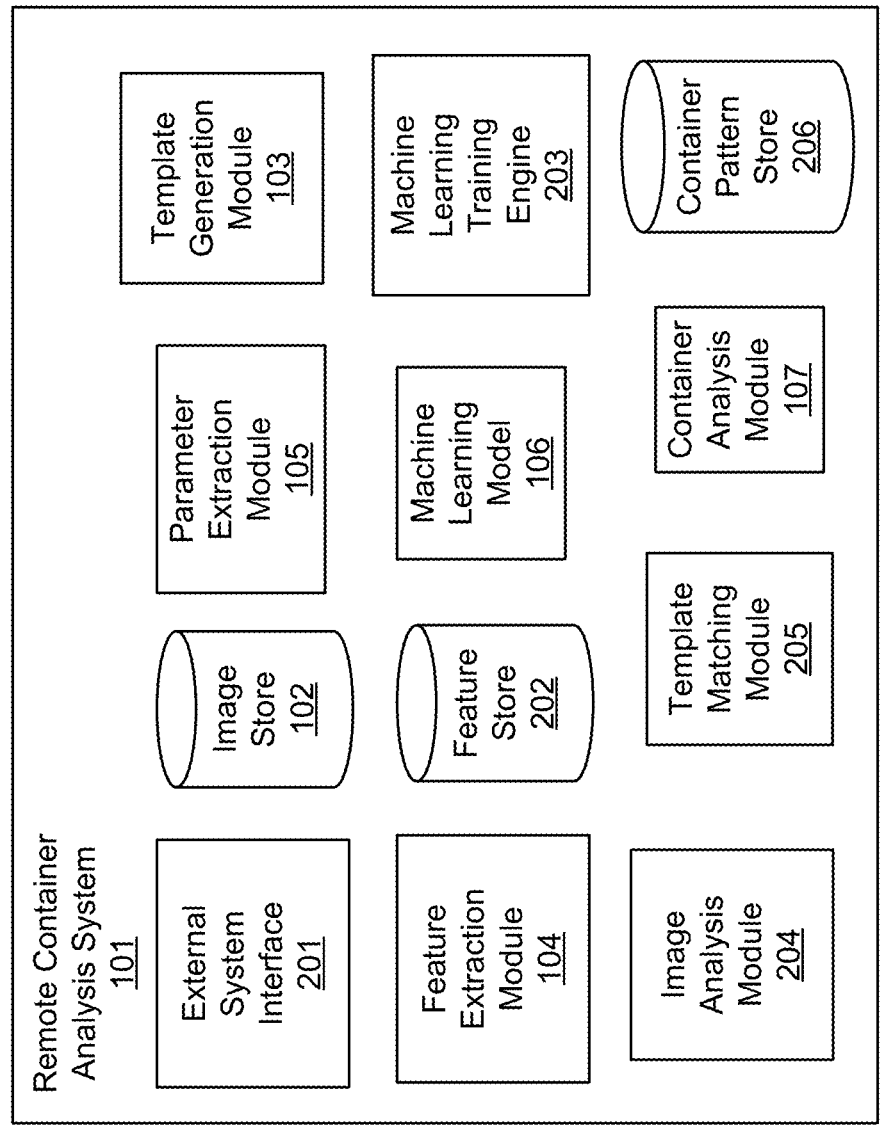
FIG. 2 illustrates a block diagram of an example system architecture for the remote container analysis system, in accordance with an embodiment.

Turning now to FIG. 2, it illustrates a block diagram of an example system architecture for the remote container analysis system 101, in accordance with an embodiment. The system architecture shown in FIG. 2 may include an external system interface 201, the image store 102, the parameter extraction module 105, the template generation module 103, the optional feature extraction module 104, an optional feature store 202, the machine learning model 106, a machine learning training engine 203, an image analysis module 204, a template matching module 205, the container analysis module 107, and a container pattern store 206.

The external system interface 201 shown in FIG. 2 may be a dedicated hardware or software networking device that receives data packets representing images from the aerial imaging device 110. The external system interface 201 may forward data packets representing visual representation of the objects of interest or information corresponding to the determined filled volume of the objects of interest from the remote container analysis system 101 via a network to user devices 120. In one example, the external system interface 201 forwards data packets at high speed along the optical fiber lines of the Internet backbone. In another example, the external system interface 201 exchanges routing information using the Border Gateway Protocol (BGP) and may be an edge router, a border router, or a core router.

The image store 102 shown in FIG. 2 may store images received from the aerial imaging device 110. To make scanning over a large area practical and efficient, lower resolution imagery is used for the first phase of the system. An example of such imagery is 15 m/pixel Landsat imagery (in the panchromatic band). The first phase of the system is designed to have high recall at the cost of lower precision. In a second phase, higher resolution imagery, e.g., 50 cm/pixel may be used to train the machine learning model 106 to filter out false alarms, as described below with reference to FIG. 4. The parameter extraction module 105, the optional feature extraction module 104, and the image analysis module 204 may retrieve images stored by the image store 102 for processing. The image store 102 may be organized as a database or table of images stored on one or more of removable or non-removable memory cards, tape cassettes, zip cassettes, and computer hard drives. In one embodiment, the image store 102 may include multiple data fields, each describing one or more attributes of the images. In one example, the image store 102 contains, for a single image, the time of capture, spectral band information, geographical area coordinates, etc.

The optional feature extraction module 104 may extract feature vectors from the images in the image store 102. The feature vector may include aggregate values based on pixel attributes of pixels in the images. In an embodiment, the feature extraction module 104 may optionally identify clusters of adjacent pixels using pixel clustering. Within an identified cluster, adjacent pixels may match each other based on a pixel attribute. For example, for a grayscale image, the pixel attribute may be a single number that represents the brightness of the pixel. In this example, the pixel attribute is a byte stored as an 8-bit integer giving a range of possible values from 0 to 255. Zero represents black and 255 represents white. Values in between 0 and 255 make up the different shades of gray. In another example of color images, separate red, green and blue components are specified for each pixel. In this example, the pixel attribute is a vector of three numbers.

The optional feature extraction module 104 shown in FIG. 2 may identify pixel clusters in the images from the image store 102 by initializing each pixel in an image as a region with the attribute of the pixel. The feature extraction module 104 identifies two adjacent regions having the most similar attribute value. These two regions are merged to form a new region containing all the pixels of the two regions and having the attribute value as the average of the attribute values of the two regions. The feature extraction module 104 repeats the process until there are no similar regions left.

Other embodiments of the feature extraction module 104 shown in FIG. 2 may use one or a combination of the following: (a) edge/corner detection methods, such as Harris Corner or Canny edge, which find edges or corners in the image to use as candidate features; (b) image gradients, which extract edge strength information; (c) oriented filters, which identify specific shapes; (d) thresholding methods, which use local or global threshold values to extract features; (e) image patch descriptors such as Scale-Invariant Feature Transform (SIFT), Speeded Up Robust Features (SURF), Features from Accelerated Segment Test (FAST), Binary Robust Independent Elementary Features (BRIEF), Fast Retina Keypoint (FREAK), and Histogram of Oriented Gradients (HOG), which calculate orientation and edge description features at a given image patch.

The feature extraction module 104 shown in FIG. 2 may perform edge analysis in the received images to identify pixels in images corresponding to the object of interest. The feature extraction module 104 may operate on each pixel location (i, j) in an image. Here, i represents the row value of a pixel location in the image and j represents the column value of the pixel in the image. In one example embodiment, S represents an image and M represents the corresponding object map image output. The function M(i, j) is defined to be 1 whenever location (i, j) in image S corresponds to an object pixel and 0 otherwise. The feature extraction module 104 may identify points in an image at which the pixel attributes change sharply. The points at which pixel attributes change sharply may be organized into a set of curved line segments termed edges. The feature extraction module 104 may perform three steps in the edge analysis process to identify pairs of edges: filtering, enhancement, and detection. The filtering step reduces noise, for example, salt and pepper noise, impulse noise and Gaussian noise in the images. The enhancement emphasizes pixels at locations (i, j) where there is a significant change in the pixel attribute value. In one example, the feature extraction module 104 performs enhancement by computing the gradient magnitude of the image at various pixel locations (i, j). The detection searches for pixel locations (i, j) that have a gradient value higher than a threshold to detect edge pixels.

In alternative embodiments, the feature extraction module 104 shown in FIG. 2 may analyze an image to create a probabilistic heat map or blocked image containing an area of interest where objects of interest are expected. The feature extraction module 104 may be further configured to incorporate other mapping sources, which contain geometric information (e.g., points, lines, and polygons). The feature extraction module 104 may use the geometric information to directly create the probabilistic heat map or in conjunction with other image processing operations, for example, as a line finding algorithm or random forest algorithm, or using machine learning methods such as Support Vector Machines (SVM), neural network, or convolutional neural network (CNN), which requires no feature extraction.

Referring back to FIG. 2, the feature extraction module 104 reduces the redundancy in images, e.g., repetitive pixel values, to transform an image into a reduced set of features (features vector). The feature vector contains the relevant information from the images, such that objects of interest can be identified by the machine learning model 106 by using this reduced representation instead of the complete initial image. Example features extracted by the feature extraction module 104 are illustrated and described in FIG. 4. In some example embodiments, the following dimensionality reduction techniques may be used by the feature extraction module 104: independent component analysis, Isomap, Kernel PCA, latent semantic analysis, partial least squares, principal component analysis, multifactor dimensionality reduction, nonlinear dimensionality reduction, Multilinear Principal Component Analysis, multilinear subspace learning, semidefinite embedding, Autoencoder, and deep feature synthesis.

The feature store 202 shown in FIG. 2 stores features extracted from received images by the feature extraction module 104. The remote container analysis system 101 retrieves the stored features for training the machine learning model 106. The feature store 202 may be organized as a database or table of images stored on one or more of removable or non-removable memory cards, tape cassettes, zip cassettes, and computer hard drives.

The remote container analysis system 101 may train the machine learning model 106 using training sets and data from the feature store 202. In one example embodiment, the machine learning model 106 may receive training sets including labeled clusters of pixels corresponding to objects of interest, as illustrated and described below with reference to FIGS. 3A and 3B. The machine learning training engine 203 shown in FIG. 2 may train the machine learning model 106 using training sets to determine scores for clusters of pixels. The score is indicative of a likelihood that the clusters corresponds to objects of interest based on the feature vector. The process followed by the machine learning training engine 203 is illustrated in FIG. 4. The remote container analysis system 101 may select clusters based on whether the score exceeds a threshold and associates the clusters with objects of interest.

In alternative example embodiments, the machine learning model 106 shown in FIG. 2 (in the form of a convolutional neural network) may generate an output, without the need for feature extraction, directly from the images. A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing. Advantages of CNNs include the obviation of feature extraction and the use of shared weight in convolutional layers, which means that the same filter (weights bank) is used for each pixel in the layer; this both reduces memory footprint and improves performance.

The machine learning model 106 may be a CNN that consists of both convolutional layers and max pooling layers. The architecture of the machine learning model 106 may be "fully convolutional," which means that variable sized input images can be fed into it. The input to the machine learning model 106 may be a panchromatic Landsat image, and the output of the machine learning model 106 may be a per-pixel probability map (i.e., for each pixel in the input image, the machine learning model 106 considers a patch around that pixel and returns the probability that that pixel is part of a tank farm). All but the last convolutional layer in the machine learning model 106 may be followed by in-place rectified linear unit activation. For all convolutional layers, the machine learning model 106 may specify the kernel size, the stride of the convolution, and the amount of zero padding applied to the input of that layer. For the pooling layers the model 106 may specify the kernel size and stride of the pooling.

The output of the machine learning model 106 (in the form of a CNN) may optionally include pixel clusters, where each pixel cluster includes one or more adjacent pixels in a distinct image of the images, where the adjacent pixels match each other based on a pixel attribute. The output may include a score indicative of a likelihood that the pixel clusters correspond to an object of interest. The output may include one or more pixels locations corresponding to an object of interest. The output may include the number of pixels in each an object of interest. The output may include an association between the pixel clusters and objects of interest.

The parameter extraction module 105 shown in FIG. 2 may extract a parameter vector from metadata in an image received from the aerial imaging device 110. The parameter vector may include example parameters describing the elevation angle of the aerial imaging device 110. The satellite elevation angle refers to the angle between a line pointing directly towards the satellite and the local horizontal plane. A parameter may describe the time of capture of the received image. A parameter may describe the azimuth angle of the aerial imaging device 110. The azimuth angle is an angular measurement in a spherical coordinate system, which refers to the angle between the line pointing directly towards the satellite and a reference vector pointing North on the reference plane.

A parameter extracted by the parameter extraction module 105 may describe the elevation angle of the sun. The elevation angle of the sun refers to the angle between a line pointing directly towards the sun and the local horizontal plane. A parameter may describe the azimuth angle of the sun. The azimuth angle of the sun refers to the angle between the line pointing directly towards the sun and a reference vector pointing North on the reference plane. A parameter may describe the geographical location of the center of the bottom of an object of interest in the image. The remote container analysis system 101 operates under the assumption that some parameters may be inaccurate. Specifically, the system assumes that the location of the object and the satellite angles may not be accurate, but may be processed as described herein.

The image analysis module 204 retrieves images from the image store 102. The image analysis module 204 may perform image analysis on an image to determine a height and a width of an object of interest in the image. For example, the image analysis module 204 may receive a pixel resolution r of the image of the object of interest. The image analysis module 204 may determine a number h of pixels associated with the height of the object of interest. The image analysis module 204 may determine the height of the object of interest based on the pixel resolution r and the number h of pixels associated with the height of the object of interest as height=r×h. The image analysis module 204 may determine the number of pixels w associated with the width of the object of interest. The image analysis module 204 may determine the width of the object of interest based on the pixel resolution r and the number of pixels w associated with the width of the object of interest as width=r×w.

The image analysis module 204 may crop the received image to position the center of the object of interest in the center of the received image. In embodiments, the image analysis module 204 may automatically remove the outer parts of the image to improve framing, accentuate the object of interest, or change the aspect ratio. The image analysis module 204 may rescale the received image of the object of interest by setting pixels corresponding to shadows and inner surfaces of the object of interest to negative values, e.g., −1, and setting pixels corresponding to the roof of the object of interest to positive values, e.g., +1.

Figure 9:
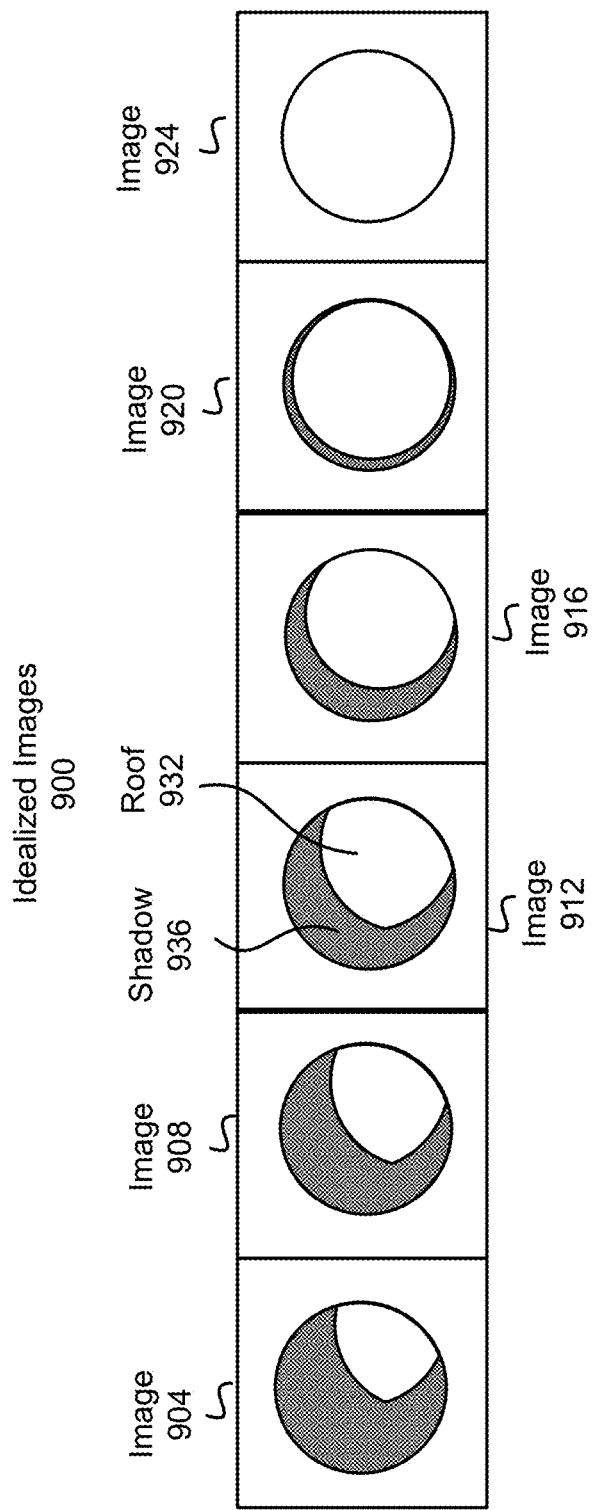
FIG. 9 illustrates a set of example idealized images, in accordance with an embodiment.

The template generation module 103 shown in FIG. 2 uses the parameter vector extracted by the parameter extraction module 105 and synthesizes idealized image templates based on trigonometric projection for the geometry of the object of interest for different filled volume percentages, e.g., 10%, 30%, etc. A set of templates is generated by varying the filled volume percentage. FIG. 9 illustrates a set of idealized images 900 for a cylindrical tank container corresponding to different filled volume percentages. The template generation module 103 generates the idealized images of the object of interest using the extracted parameter vector, the determined height, and the determined width of the object of interest. To allow for inaccuracies in the satellite view angles (elevation and azimuth), the template generation module 103 may perform a sweep over a range of angle values around the angle values extracted by the feature extraction module 104.

The template generation module 103 assumes that the received image has the object of interest in the center, although some error in the precise location is allowed for by the synthesis process. The template generation module 103 also assumes that the object, including its roof, is light-colored. It assumes that shadows cast by the roof of the object and its top rim, and the inner walls of the object are dark-colored. Idealized image templates are constructed from the position of circles, as illustrated and described below with reference to FIG. 7. The circles correspond to the top rim of the object of interest, the bottom of the object of interest, the arc of the shadow on the inner surface of the object of interest, and the roof of the object of interest. In embodiments illustrated in FIG. 8, the idealized images may be constructed from only the position of the circles corresponding to the top rim of the object of interest, the arc of the shadow on the inner surface of the object of interest, and the roof of the object of interest. The template generation module 103 uses the object's height and width, desired floating-roof height, the two satellite angles and the two sun angles. Using that information and the trigonometric equations shown in FIG. 8, the template generation module 103 creates 2D projections of where the circles lie. The template generation module 103 may also crop each idealized image to position the center of the object of interest in the center of each idealized image.

Once the circle positions are generated, the template generation module 103 synthesizes the idealized images illustrated in FIG. 9 for different filled volumes of the object by performing a convolution on the circle corresponding to the top rim, the circle corresponding to the arc of the shadow, and the circle corresponding to the roof. The template generation module 103 performs the convolution by performing unions and intersections between the three circles to generate the "eyeball" shapes (dark and shadow regions) for the idealized object images shown in FIG. 9. The template generation module 103 may rescale each idealized image of the object of interest by setting pixels corresponding to shadows and inner surfaces of the object of interest to negative values such as −1, setting pixels corresponding to the roof of the object of interest to positive values such as +1, and setting all other pixels to 0.

Unions and intersections between the three circles may be performed by the template generation module 103, e.g., using morphological image processing. Morphological image processing refers to non-linear operations related to the shape or morphology of features in an image. Morphological image processing operations rely only on the relative ordering of pixel values, not on their numerical values, and therefore are suited to the rescaled idealized images. The intersection of two images A and B, written A∩B, is the binary image which is 1 at all pixels p which are 1 in both A and B. The union of A and B, written A∪B is the binary image which is 1 at all pixels p which are 1 in A or 1 in B (or in both).

The template matching module 205 shown in FIG. 2 matches the received image of the object of interest to each idealized image synthesized by the template generation module 103 to determine a filled volume of the object of interest. The matching may be performed by performing a dot product between pixels of the received image and pixels of the idealized image. Because the received image and the idealized image are rescaled such that its pixel values range from −1 to +1, i.e., dark pixels (shadows, inner wall, etc.) are negative and light pixels (roof, etc.) are positive, performing a dot product between the received image and the idealized image results in a large positive number if the received image and the idealized image look similar. This is because positive pixels in the received image line up with positive pixels in the idealized image, and negative pixels in the received image line up with negative pixels in the idealized image.

Performing the dot product by the template matching module 205 shown in FIG. 2 is an algebraic operation that takes pixels of the received image and pixels of the idealized image and returns a single number. Algebraically, the dot product is the sum of the products of the corresponding pixel values of the pixels of the received image and pixels of the idealized image. For example, the dot product of the two images $A=[a_1, a_2, \ldots, a_n]$ and $B=[b_1, b_2, \ldots, b_n]$, where A is the received image and B is the idealized image template may be determined as $A \cdot B = \Sigma_i a_i b_i = a_1 b_1 + a_2 b_2 + \ldots + a_n b_n$. Further details of the convolutions performed by the image analysis module 204 and the template matching module 205 to avoid false positive matches are illustrated and described below with reference to FIG. 10A.

To allow for inaccuracies in geo-referenced imagery, and the fact that an object may not be precisely in the location expected, the template matching module 205 performs a sweep over the received image to account for a number of possible locations of the object. The template matching module 205 performs the sweep by using 2D convolution between the received image and each template. Once the template matching module 205 has found a template match for the received image of the object of interest, it determines the filled volume of the object of interest as the filled volume corresponding to the matching idealized image template.

The container analysis module 107 may analyze an object of interest pattern including one or more of the time of capture of the received image, the count of one or more objects of interest in the received image, and the determined filled volume of each of one or more objects of interest in the received image. The container analysis module 107 may send information to the user device 120 if the analyzed object of interest pattern exceeds a threshold. For example, the container analysis module 107 may send information to the user device 120 if the count of the objects of interest in the received image exceeds a threshold or the determined filled volume of a threshold number of objects exceeds a threshold.

The container pattern store 206 shown in FIG. 2 may store patterns received from the container analysis module 107. The container pattern store 206 may be organized as a database or table stored on one or more of removable or non-removable memory cards, tape cassettes, zip cassettes, and computer hard drives. In one embodiment, the container pattern store 206 stores multiple data fields, each describing one or more attributes of an object. In one example, the container pattern store 206 stores, for a single object, the time of capture of images, geographical region coordinates the height of the object, and/or the width of the object.

Example Machine Learning Training Sets

Figure 3A:
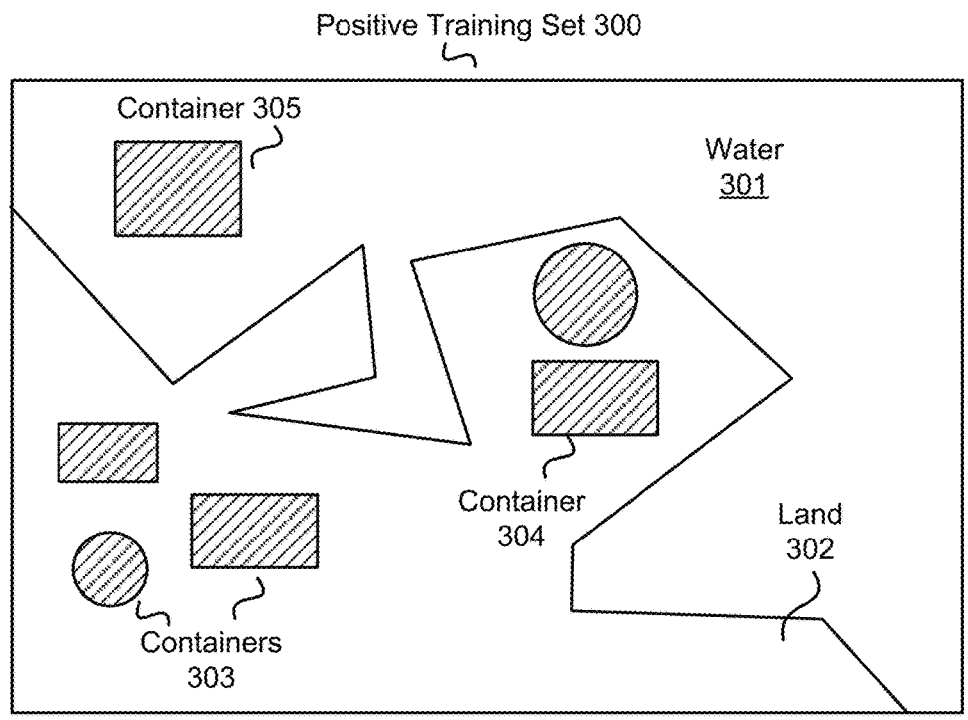
FIG. 3A illustrates an example positive training set for the remote container analysis system, in accordance with an embodiment.

FIG. 3A illustrates an example positive training set 300 for the remote container analysis system 101, in accordance with an embodiment. As part of the training of the machine learning model 106, the machine learning training engine 203 forms a training set of features and training labels, e.g., container 305, by identifying a positive training set of features that have been determined to have the property in question (presence of containers), and, in some embodiments, forms a negative training set of features that lack the property in question, as described below in detail with reference to FIG. 3B. For example, each training set may include labeled pixel clusters corresponding to containers, e.g., containers 303. To collect a training set, polygons may be marked around known tank farms around the world and downloaded Landsat 8 imagery may be intersected with these polygons. Randomly sampled imagery may also be collected for a set of negative examples (i.e., images that contain no oil tank farms). Once trained, the machine learning model 106 may be run on all imagery in a region of interest (e.g., the United States). The final output of the remote container analysis system 101 is a set of areas of interest (geometry polygons) where the machine learning model 106 returned a high output score.

The positive training set 300 shown in FIG. 3A contains features that have been determined to have the presence of containers. The positive training set 300 may include labeled pixel clusters corresponding to container 305, containers 303, and container 304. The positive training set 300 also contains labels for background regions water 301 and land 302. The example training set 300 may correspond to a port where the land 302 meets water 301. In the positive training set 300, container 305 is in the area labeled water, while containers 303 and container 304 are in the area labeled land.

Figure 3B:
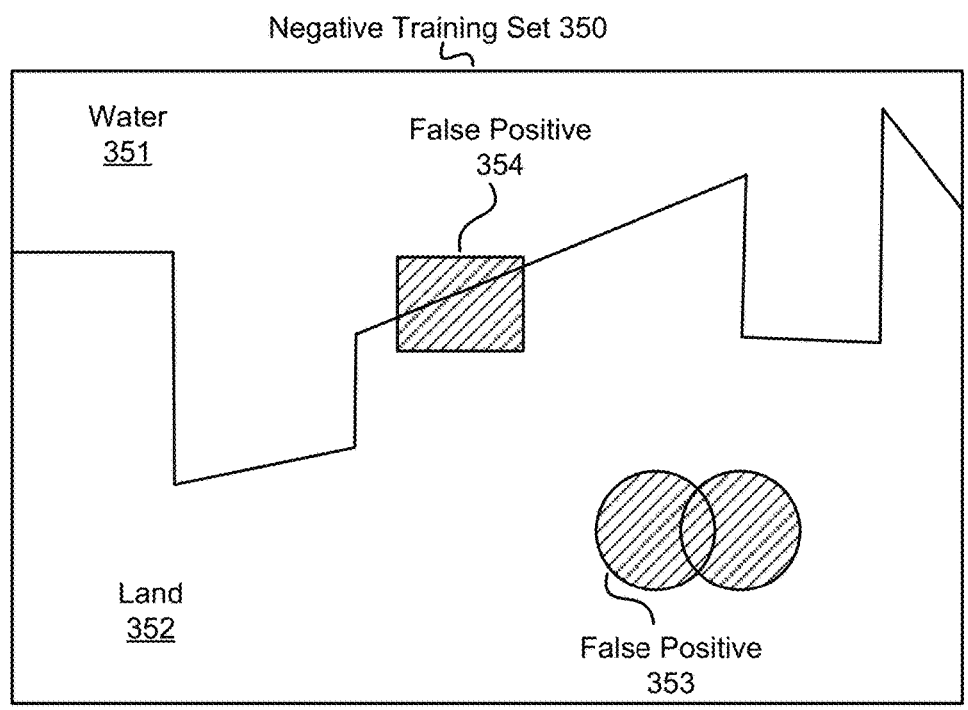
FIG. 3B illustrates an example negative training set for the remote container analysis system, in accordance with an embodiment.
Figure 4:
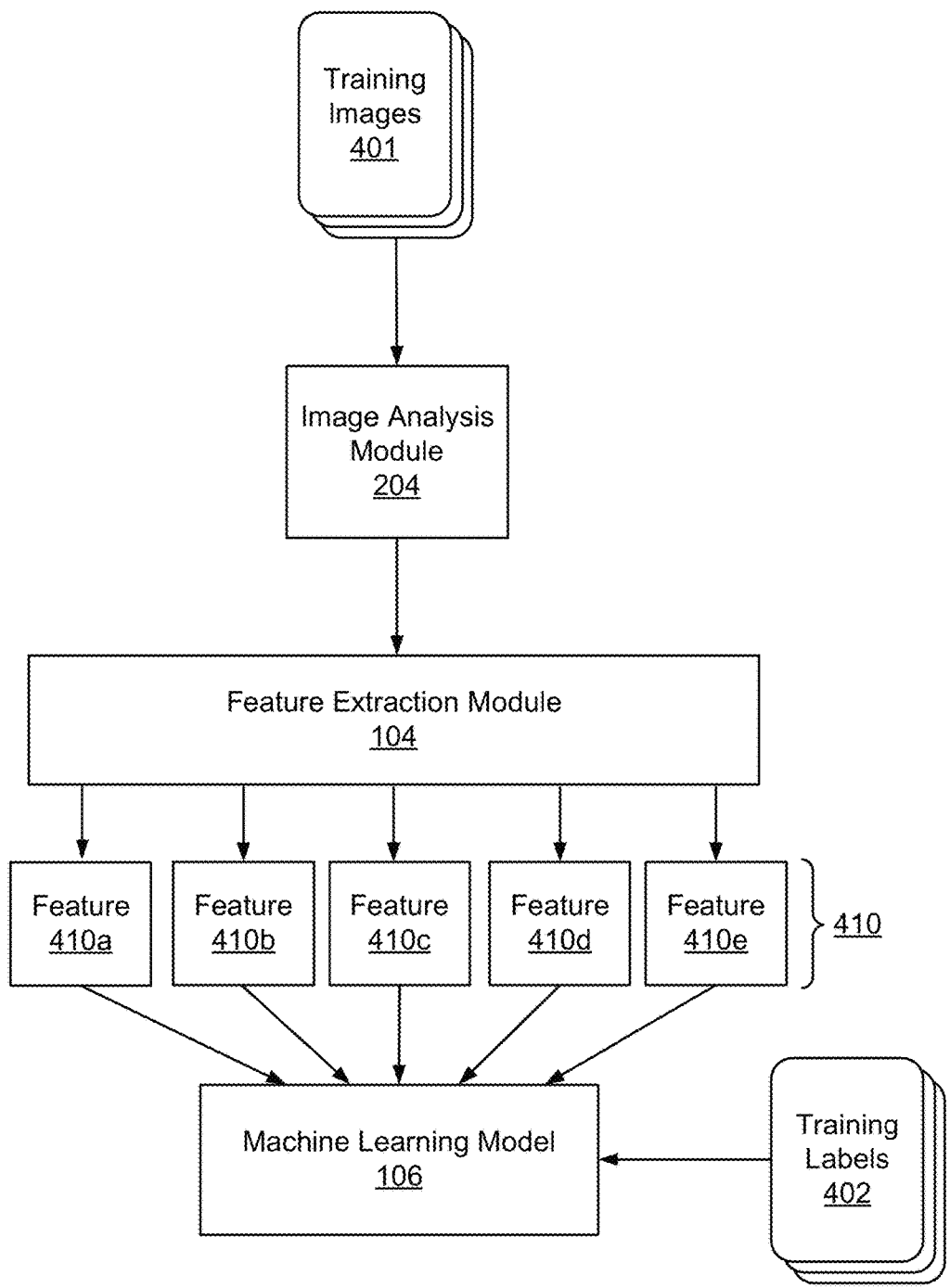
FIG. 4 illustrates an example process for training a machine learning model in the remote container analysis system, in accordance with an embodiment.

FIG. 3B illustrates an example negative training set 350 for the remote container analysis system 101, in accordance with an example embodiment. The negative training set 350 shown in FIG. 3B contains features that have been determined to lack the presence of containers. The negative training set 350 includes a false positive cluster of pixels 354 that is located partly in the water 351 and partly on the land 352. The negative training set 350 also includes a false positive cluster of pixels 353 related to two intersecting clusters of pixels. Since two containers cannot intersect each other, these two intersecting clusters of pixels are a false positive and labeled as such (353).

In some example embodiments, the training sets 300 and 350 may be created by manually labeling pixel clusters that represent high scores and pixel clusters that represent low scores. In other embodiments, the machine learning training engine 203 may extract training sets from stored images obtained from the image store 102. For example, if a stored image contains pixel clusters located on land, e.g., containers 303, the machine learning training engine 203 may use the pixel clusters as a positive training set. If a stored image contains a pixel cluster located partly on land and partly on water, e.g., false positive 354, the machine learning training engine 203 may use the pixel cluster as a negative training set.

Example Machine Learning Training Process

Referring now to FIG. 4, it illustrates an example training process for the machine learning training engine 203 for the machine learning model 106 in the remote container analysis system 101. The process may use the image analysis module 204, the feature extraction module 104, and the machine learning model 106. FIG. 4 and the other figures use like reference numerals to identify like elements. A letter after a reference numeral, such as "410a," indicates that the text refers specifically to the element having that particular reference numeral. A reference numeral in the text without a following letter, such as "410," refers to any or all of the elements in the figures bearing that reference numeral, e.g., "410" in the text refer to reference numerals "410a" and/or "410b" in the figures.

The image analysis module 204 may perform edge analysis in the training images 401 to identify pixels in the training images 401 corresponding to the objects of interest. The feature extraction module 104 shown in FIG. 4 extracts features 410 from the training images 401. The features 410 corresponding to the training images 401 are used for training the machine learning model 106 based on training labels 402. In one example embodiment, a feature 410a may represent aggregate values based on pixel attributes of pixels in the images 401. Extracting the feature 410a from the training images 401 may include performing pixel clustering to identify clusters of adjacent pixels in the training images 401. The adjacent pixels in the training images 401 match each other based on a pixel attribute. An example feature 410b may represent whether two clusters of adjacent pixels in an image intersect each other; this feature teaches the machine learning model 106 that the two pixel clusters may not represent a container because containers cannot intersect.

An example feature 410c may represent whether a cluster of pixels is located partly on land and partly on water; this feature teaches the machine learning model 106 that the pixel cluster may not represent a container because containers cannot be located partly on land 302 and partly on water 301. A feature 410d may represent an association between pixel locations and a pixel attribute. For example, the feature 410d may represent the brightness value of a pixel relative to pixels located on its right in an image; this feature teaches the machine learning model 106 that the pixel may be part of a pixel cluster representing a container because the pixel is brighter than surrounding pixels. A feature 410e may represent the brightness of a pixel relative to the average brightness of pixels located on the same row in an image; this feature teaches the machine learning model 106 that the pixel may be part of an image blob representing a container because the pixel is brighter (e.g., greater illumination) than surrounding pixels.

The machine learning training engine 203 may train the machine learning model 106 shown in FIG. 4 using the feature vector 410 and training labels 402. In one embodiment, the machine learning model 106 is thereby configured to determine a score for each pixel location in an image, the score indicative of a likelihood that the pixel location corresponds to a container. In another embodiment, the machine learning model 106 is configured to determine a score for pixel clusters, the score indicative of a likelihood that the pixel clusters correspond to containers. In alternative embodiments, the machine learning model 106 is configured to generate an output including pixel clusters and a score indicative of a likelihood that the pixel clusters correspond to containers. In an embodiment, the machine learning model 106 is configured to generate an output including one or more pixel locations corresponding to a pixel cluster and a score indicative of a likelihood that the pixel locations correspond to a pixel cluster. In an embodiment, the machine learning model 106 is configured to generate an output including a number of pixels in each identified pixel cluster. In an embodiment, the machine learning model 106 is configured to generate an output including an association between the identified pixel clusters and containers.

The machine learning model training engine 203 may apply machine learning techniques to train the machine learning model 106 that when applied to features outputs indications of whether the features have an associated property or properties, e.g., that when applied to features of received images outputs estimates of whether there are containers present, such as probabilities that the features have a particular Boolean property, or an estimated value of a scalar property. The machine learning training engine 203 may apply dimensionality reduction (e.g., via linear discriminant analysis (LDA), principle component analysis (PCA), or the like) to reduce the amount of data in the feature vector 410 to a smaller, more representative set of data.

The machine learning training engine 203 may use supervised machine learning to train the machine learning model 106 shown in FIG. 4, with the feature vectors 410 of the positive training set 300 and the negative training set 350 serving as the inputs. In other embodiments, different machine learning techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., may be used. The machine learning model 106, when applied to the feature vector 410 extracted from a set of received images, outputs an indication of whether a pixel cluster has the property in question, such as a Boolean yes/no estimate, or a scalar value representing a probability.

In some example embodiments, a validation set is formed of additional features, other than those in the training sets, which have already been determined to have or to lack the property in question. The machine learning training engine 203 applies the trained machine learning model 106 shown in FIG. 4 to the features of the validation set to quantify the accuracy of the machine learning model 106. Common metrics applied in accuracy measurement include: Precision=TP/(TP+FP) and Recall=TP/(TP+FN), where Precision is how many the machine learning model 106 correctly predicted (TP or true positives) out of the total it predicted (TP+FP or false positives), and Recall is how many the machine learning model 106 correctly predicted (TP) out of the total number of features that did have the property in question (TP+FN or false negatives). The F score (F-score=2×PR/(P+R)) unifies Precision and Recall into a single measure. In one embodiment, the machine learning training engine 203 iteratively re-trains the machine learning model 106 until the occurrence of a stopping condition, such as the accuracy measurement indication that the machine learning model 106 is sufficiently accurate, or a number of training rounds having taken place.

In alternative embodiments, the machine learning model 106 may be a CNN that learns useful representations (features) such as which pixel clusters correspond to containers directly from training sets without explicit feature extraction. For example, the machine learning model 106 may be an end-to-end recognition system (a non-linear map) that takes raw pixels from the training images 401 directly to internal labels. The machine learning model 106 shown in FIG. 4 (in the form of a CNN) may generate an output directly from the training images 401, without the need for feature extraction, edge analysis or pixel cluster identification.

Example Process for Identifying Remote Objects

Figure 5:
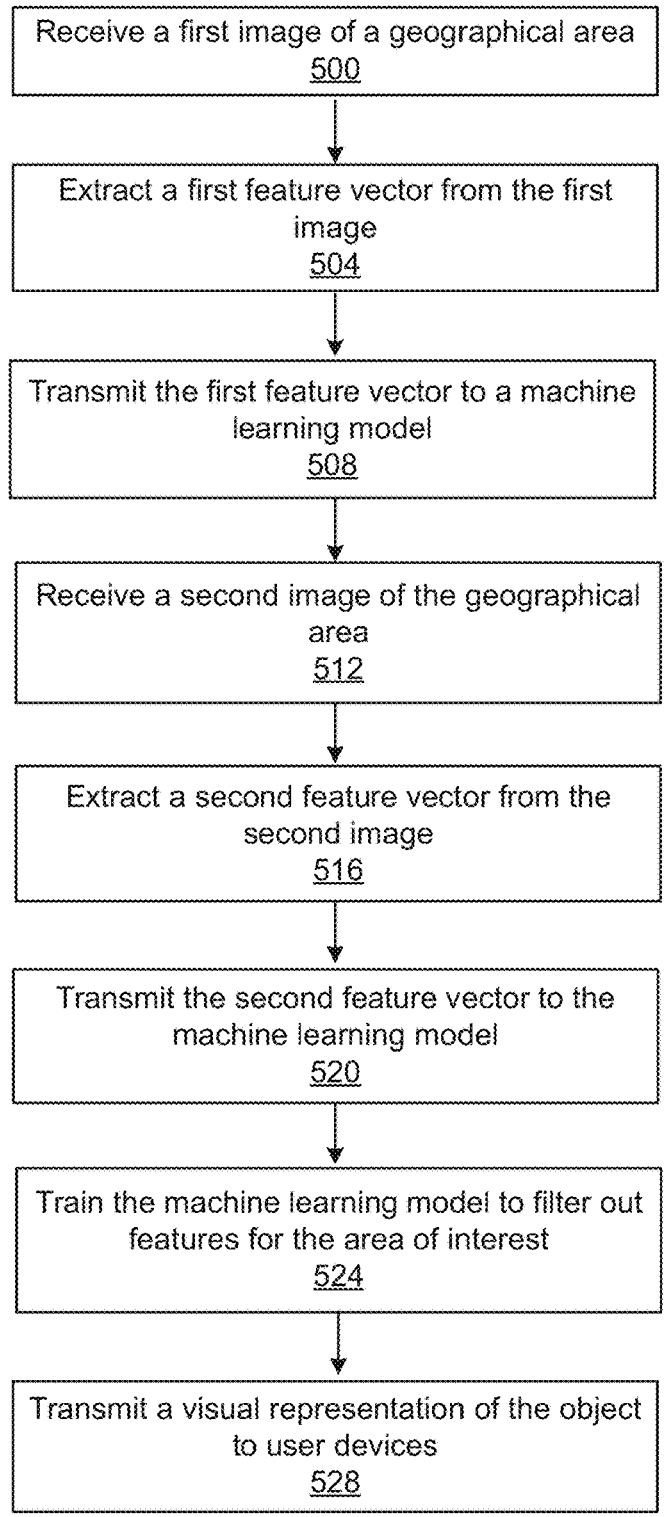
FIG. 5 illustrates an example process for the remote container analysis system for identifying remote objects, in accordance with an embodiment.

FIG. 5 illustrates an example process for the remote container analysis system 101 for identifying remote objects, in accordance with an embodiment. In some example embodiments, the process may have different and/or additional steps than those described in conjunction with FIG. 5. Steps of the process may be performed in different orders than the order described in conjunction with FIG. 5. Some steps may be executed in parallel. Alternatively, some of the steps may be executed in parallel and some steps executed sequentially. Alternatively, some steps may execute in a pipelined fashion such that execution of a step is started before the execution of a previous step.

The remote container analysis system 101 receives 500 a first image of a geographical area, where the first image has a first resolution. The first image is of a large geographic region. The large geographic region may be predefined, for example, based on area. This area may be, for example, an entire country, e.g., the United States, or a smaller portion such as a state/province or city, e.g., Texas or Houston. To make scanning over a large area practical and efficient, lower resolution imagery is used for the first image. An example of such imagery is 15 m/pixel Landsat imagery (in the panchromatic band). The feature extraction module 104 extracts 504 a first feature vector from the first image. The first feature vector may include aggregate values based on pixel attributes of pixels in the first image, as described above with reference to FIG. 2. The remote container analysis system 101 transmits 508 the first feature vector to the machine learning model 106 to identify an area of interest containing an object of interest in the first image. Identifying the area of interest containing the object of interest in the first image includes, for each pixel in the first image, determining a likelihood that the pixel corresponds to the object of interest, as described above with reference to FIGS. 2 and 4. The machine learning model 106 is trained to have high Recall at the price of lower Precision (e.g., a higher false positive rate).

The remote container analysis system 101 receives 512 a second image of the geographical area. The second image has a second resolution higher than the first resolution. The processing of the low resolution first image is followed by a cleanup phase on the second image. To filter out the false positives, a second pass is performed over all areas of interest returned by the first pass. This time higher resolution imagery is used where individual containers can be seen more clearly (e.g., using 50 cm per pixel imagery). The feature extraction module 104 extracts 516 a second feature vector from the second image. The second feature vector includes aggregate values based on pixel attributes of pixels in the area of interest, as described above with reference to FIG. 2.

The remote container analysis system 101 transmits 520 the second feature vector to the machine learning model 106 to determine a likelihood that the area of interest contains the object of interest. Determining the likelihood that the area of interest contains the object of interest includes, for each pixel in the area of interest, determining a likelihood that the pixel corresponds to the object of interest, as described above with reference to FIGS. 2 and 4. If the likelihood is below a threshold, the remote container analysis system 101 trains 524 the machine learning model to filter out features corresponding to the area of interest in images having the first resolution. To improve the accuracy of the machine learning model 106 a procedure may be performed that is referred to as "bootstrapping" or "hard negative mining." The clean-up is restricted to a reasonably small set of high scoring areas of interest. Areas of interest receiving a high score but containing no objects are added back into the negative training sets, and the machine learning model 106 is trained again. This procedure ensures that the training set contains "difficult" negative examples and can improve precision and reduce the number of false positives.

In one example embodiment, training 524 the machine learning model 106 to filter out the features corresponding to the area of interest includes extracting a feature vector corresponding to the area of interest from the first image. The remote container analysis system 101 creates a training set including the feature vector and a label corresponding to a lack of objects of interest in the first image. The remote container analysis system 101 configures the machine learning model 106, based on the training set, to identify the lack of objects of interest in the first image. In another example embodiment, training 524 the machine learning model 106 to filter out the features corresponding to the area of interest includes extracting a feature vector corresponding to the area of interest from the first image and configuring the machine learning model 106, based on the extracted feature vector, to report a lack of objects of interest in the first image.

If the likelihood that the area of interest in the second image contains the object of interest exceeds a threshold, the remote container analysis system 101 transmits 528 a visual representation of the object of interest to a user device, as described in FIG. 2.

Example Process for Determining the Filled Volume of Remote Objects

Figure 6:
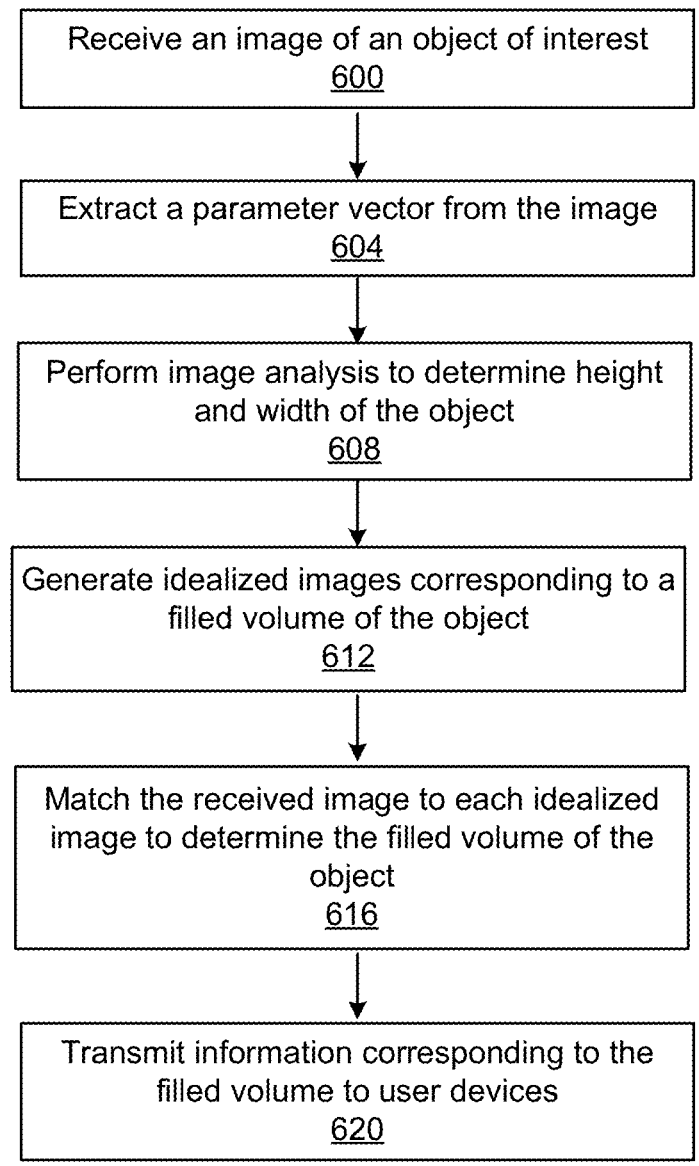
FIG. 6 illustrates an example process for the remote container analysis system for determining the filled volume of remote objects, in accordance with an embodiment.

FIG. 6 illustrates an example process for the remote container analysis system 101 for determining the filled volume of remote objects, in accordance with an embodiment. In some embodiments, the process may have different and/or additional steps than those described in conjunction with FIG. 6. Steps of the process may be performed in different orders than the order described in conjunction with FIG. 6. Some steps may be executed in parallel. Alternatively, some of the steps may be executed in parallel and some steps executed sequentially. Alternatively, some steps may execute in a pipelined fashion such that execution of a step is started before the execution of a previous step.

The remote container analysis system 101 processes satellite imagery to search for intersections of imagery and known floating-roof container locations. The container image is received 600 and cropped such that the center of the container is in the center of the image. Using the cropped image, the task is to determine the filled volume of the container (i.e., determine how far down the roof is). In an example embodiment, the system is configured so that the containers are assumed to be light colored, and the inner walls of each container are dark colored. The remote container analysis system 101 extracts 604 a parameter vector from the image. The parameter vector may include parameters describing the latitude and longitude of the container, an image timestamp, the satellite elevation and azimuth angles, the sun elevation and azimuth angles, and the tank height and width (or diameter).

In an example embodiment, the remote container analysis system 101 may perform 608 image analysis on the image to determine the height and width of the object of interest (container), as described above with reference to FIG. 2. The remote container analysis system 101 generates 612 idealized images of the object of interest using the extracted parameter vector, the determined height, and the determined width of the object of interest, as described above with reference to FIG. 2 and illustrated below with reference to FIG. 7. Each idealized image corresponds to a distinct filled volume of the object of interest, as illustrated and described below with reference to FIG. 9.

The remote container analysis system 101 matches 616 the received image of the object of interest to each idealized image to determine the filled volume of the object of interest. The matching includes performing a dot product between pixels of the received image and pixels of the idealized image, as described above with reference to FIG. 2 and further illustrated below with reference to FIG. 9. The remote container analysis system 101 transmits 620 information corresponding to the determined filled volume of the object of interest to a user device 120, as described above with reference to FIG. 2.

Example Synthesis of Idealized Images

Figure 7:
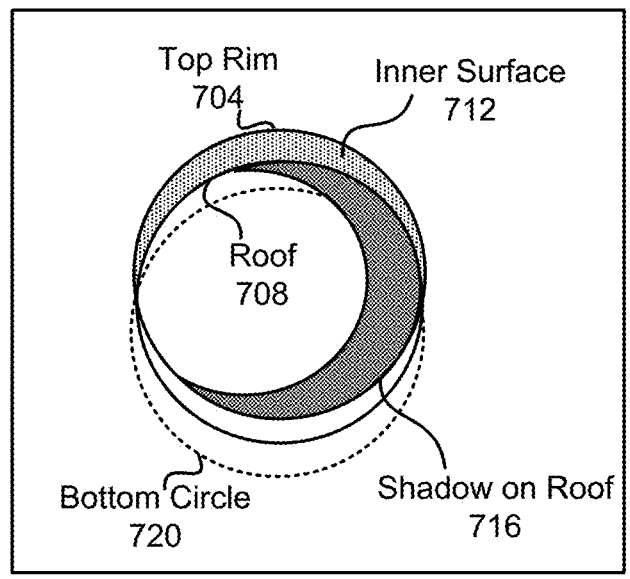
FIG. 7 illustrates an example synthesis of an idealized image, in accordance with an embodiment.

FIG. 7 illustrates an example synthesis 700 of an idealized image, in accordance with an embodiment. The template generation module 103 assumes that the container, including its roof, is white or light-colored. It also assumes that shadows and the inner container surfaces are black. The template generation module 103 generates idealized image templates from the positions of circles: a top circle 704 (the top rim of the object), a bottom circle 720 (the bottom of the object, where it contacts the ground), a roof height circle 708 (that represents the roof of the object), and an internal shadow circle (generated from the arc of the internal shadow on the inner surface 712 of the object). In embodiments, only the top circle 704, roof height circle 708, and internal shadow circle 712 may be used. To generate the idealized image templates, the template generation module 103 uses the following information: object height and width, desired roof height, the two satellite angles, and the two sun angles. Based on the information above and the trigonometric equations shown in FIG. 8, the template generation module 103 creates 2D projections of where the circles lie.

The template generation module 103 generates an idealized image for a given filled volume of the object by generating the circle 704 corresponding to the top rim of the object of interest using the parameter vector as shown in FIG. 8. The template generation module 103 generates a circle corresponding to an arc of a shadow on an inner surface 712 of the object of interest using the parameter vector. The template generation module 103 generates the circle 708 corresponding to the roof of the object of interest using the parameter vector. The template generation module 103 uses the shadow 716 on the roof to create a template corresponding to the desired roof height as shown in FIG. 8. The template generation module 103 may synthesize the idealized image by performing a convolution on the circle 704, the circle 720, the circle corresponding to the arc of the internal shadow 712, and the circle 708.

Once the circle positions are known, the template generation module 103 computes unions and intersections to generate the "eyeball" shape (dark and shadow regions) template shown in FIG. 7, as described above with reference to FIG. 2. In the final templates, internal shadow pixels and interior wall pixels are set to −1, roof pixels are set to +1, and all other pixels are set to 0. This is done so that dark pixels (e.g., shadows and inner surfaces) are negative and light pixels (e.g., roof) are positive. A dot product performed between the input image and an idealized image will then result in a large positive number if the template and image are similar because positive pixels in the image will line up with positive pixels in the idealized image, and negative pixels in the image will line up with negative pixels in the idealized image.

Example Circle Projection Equations

FIG. 8 illustrates a set of example circle projection equations, in accordance with an embodiment. The template generation module 103 generates idealized image templates from the positions of the circles illustrated and described above with reference to FIG. 7 based on the extracted parameters and the trigonometric equations shown in FIG. 8.

In one embodiment, the template generation module 103 may create projections, based on the trigonometric equations shown in FIG. 8 to map the parameter vector onto the circles. The template generation module 103 may project the shadows cast by the top rim onto the roof and the inner surface onto a plane as follows. The projection of a point is its shadow on the plane. The shadow of a point on the plane is the point itself. For example, the projection from a point onto a plane may be performed as follows. If C is a point, called the center of projection, then the projection of a point P different from C onto a plane that does not contain C is the intersection of the line CP with the plane. The points P, such that the line CP is parallel to the plane do not have any image by the projection. However, they are regarded as projecting to a point at infinity of the plane. The projection of the point C itself is not defined. In another example, the projection may be performed parallel to a direction D, onto a plane as follows. The image of a point P is the intersection with the plane of the line parallel to D passing through P.

In alternative embodiments, the template generation module 103 may define a projective space P(V) of dimension n over a field K as the set of the lines in a K-vector space of dimension n+1. If a basis of V has been fixed, a point of V may be represented by a point $(x_0, \ldots, x_n)$ of $K^{n+1}$. A point of P(V), being a line in V, may thus be represented by the coordinates of any nonzero point of this line. Given two projective spaces P(V) and P(W) of the same dimension, the template generation module 103 may generate an homography as a mapping from P(V) to P(W), which is induced by an isomorphism of vector spaces f:V→W. Such an isomorphism induces a bijection from P(V) to P(W), because of the linearity off. Two such isomorphisms, f and g, may define the same homography if and only if there is a nonzero element a of K such that g=af.

Example Idealized Images

FIG. 9 illustrates a set of example idealized images 900, in accordance with an embodiment. The idealized images 900 are generated by the template generation module 103 by varying the filled volume percentage of the container of interest from 0% filled (image 904) to 100% filled (image 924). In image 908, the filled volume percentage of the container is 20%. In image 912, the filled volume percentage of the container is 40%. The shadow 936 in image 912 cast by the top rim of the container on the roof 932 and the inner surface of the container is smaller than the shadow in image 908.

In image 916, the filled volume percentage of the container is 60%. The shadow in image 916 cast by the top rim of the container on the roof and the inner surface of the container is smaller than the shadow 936 in image 912. In image 920, the filled volume percentage of the container is 80%. The shadow in image 920 cast by the top rim of the container on the roof and the inner surface of the container is smaller than the shadow in image 916. In image 924, the filled volume percentage of the container is 100%. There is no shadow in image 924.

For a given set of inputs, the remote container analysis system 101 determines which idealized template among the images 900 matches the received image best, and then returns the corresponding filled volume percentage. In one example embodiment, the template matching module 205 determines the filled volume of the container based on the received image, the satellite and sun angles, and the container dimensions as follows. The template matching module 205 sets the variable "best_score" to a large negative number. The template matching module 205 sets the variable "best_fill_percentage" to −1. The template matching module 205 performs the following steps for different filled volume percentages from 0% to 100%. The template matching module 205 determines the score from matching the received image to each template. If the score is higher than "best_score," the template matching module 205 sets the value of "best_score" to the score and the value of "best_fill_percentage" to the filled volume percentage. At the end of the process, the template matching module 205 returns the value of "best_fill_percentage."

Example Image Gradients and Outlines of Remote Objects

Figure 10A:
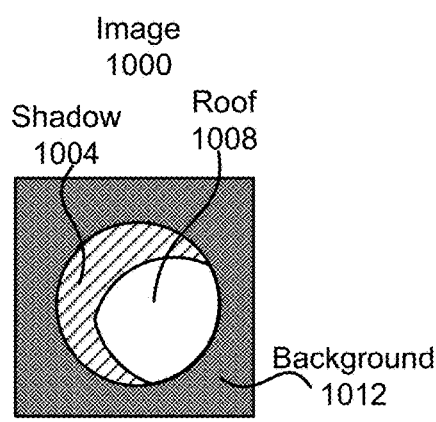
FIG. 10A illustrates an example received image of a container, in accordance with an embodiment.

Referring now to FIG. 10A, it illustrates an example received image 1000 of a container, in accordance with an embodiment. The container has a roof 1008 having a shadow 1004. When the roof 1008 of the floating-roof container is all the way up (a full container), the matching idealized image is a white circle (where all the pixels have value 1) surrounded by gray pixels 1012 (pixels with a value of 0), illustrated above as image 924 in FIG. 9. This template will match any white region with the same score. To avoid false positives, gradient information from the received image 1000 may be incorporated by the template matching module 205.

Figure 10B:
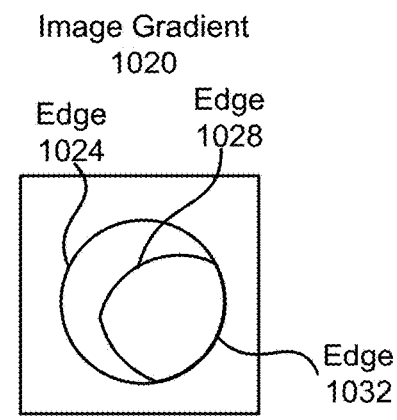
FIG. 10B illustrates an example image gradient for a received image, in accordance with an embodiment.

FIG. 10B illustrates an example image gradient 1020 for the received image 1000 of FIG. 10A, in accordance with an embodiment. The image analysis module 204 may perform edge analysis, as described above with reference to FIG. 2, on the received image 1000 to obtain the image gradient 1020 of the received image 1000. The image gradient 1020 represents the directional change in the intensity or color in the image 1000. The image analysis module 204 may derive the image gradient 1020 as a single value at each pixel. At each image point, the gradient denotes the largest possible intensity increase. The edge 1024 in FIG. 10B represents the change in the intensity or color in the image 1000 from the background 1012 to the shadow 1004 in FIG. 10A. The edge 1028 in FIG. 10B represents the change in the intensity or color in the image 1000 from the shadow 1004 to the roof 1008 in FIG. 10A. The edge 1032 in FIG. 10B represents the change in the intensity or color in the image 1000 from the roof 1008 to the background 1012 in FIG. 10A.

Figure 10C:
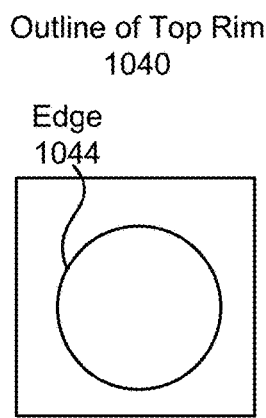
FIG. 10C illustrates an example outline of the top rim of a container in an idealized image, in accordance with an embodiment.

FIG. 10C illustrates an example outline 1040 of a top rim 1044 of the object of interest (container) in an idealized image template, in accordance with an embodiment. The image analysis module 204 may perform edge analysis on the idealized image to obtain the outline 1040 of the top rim 1044 of the container in the idealized image. For example, the image analysis module 204 may perform edge thinning to remove the unwanted spurious points on the edge 1044 in the outline 1040. The image analysis module 204 may perform edge thinning after the idealized image has been filtered for noise (e.g., using median, Gaussian filters etc.), the edge operator has been applied (as described above with reference to FIG. 2) to detect the edge 1044, and after the edge 1044 has been smoothed using an appropriate threshold value. This removes all the unwanted points and results in one-pixel-thick edge elements in an embodiment.

The template matching module 205 may perform a dot product between pixels of the image gradient 1020 and pixels of the outline 1040 of the top rim 1044 in order to determine the filled volume of the container in the received image 1000. The benefits and advantages of this process are that sharp and thin edges lead to greater efficiency in template matching. Using Hough transforms to detect arcs (of shadows) and circles (e.g., the top rim) results in greater accuracy.

Figure 10D:
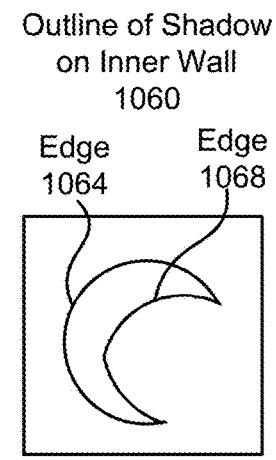
FIG. 10D illustrates an example outline of a shadow on the inner surface of a container in an idealized image, in accordance with an embodiment.

FIG. 10D illustrates an example outline 1060 of the shadow on the inner surface of a container in an idealized image template, in accordance with an embodiment. The image analysis module 204 may perform edge analysis on the idealized image to obtain the outline 1060 of the shadow on the inner surface of the container. In FIG. 10D, edge 1064 represents the change in the intensity or color in the idealized image from the background to the shadow on the inner surface. Edge 1068 represents the change in the intensity or color in the idealized image from the shadow on the inner surface to the roof. The template matching module 205 may perform a dot product between pixels of the image gradient 1020 and pixels of the outline of the shadow 1060 in order to determine the filled volume of the container in the received image 1000.

In some example embodiments, three convolutions may be performed and added up to form the response map. The first convolution is between the received image 1000 and the idealized image template, e.g., image 912 in FIG. 9. The second convolution is between the image gradient 1020 and the outline of the top rim 1040. The third convolution is between the image gradient 1020 and the outline of the shadow 1060. The three resulting response maps may be summed, and the location with the maximal response within a specified radius of the center of the image may be determined as the final template match score. The above procedure may be generalized to any situation where the geometry of the object of interest is known and characterized by a small number of parameters, most of which are known. The unknown parameters can then be determined by sweeping over possible values, generating templates, and matching them to the input image.

Example Machine Architecture

Figure 11:
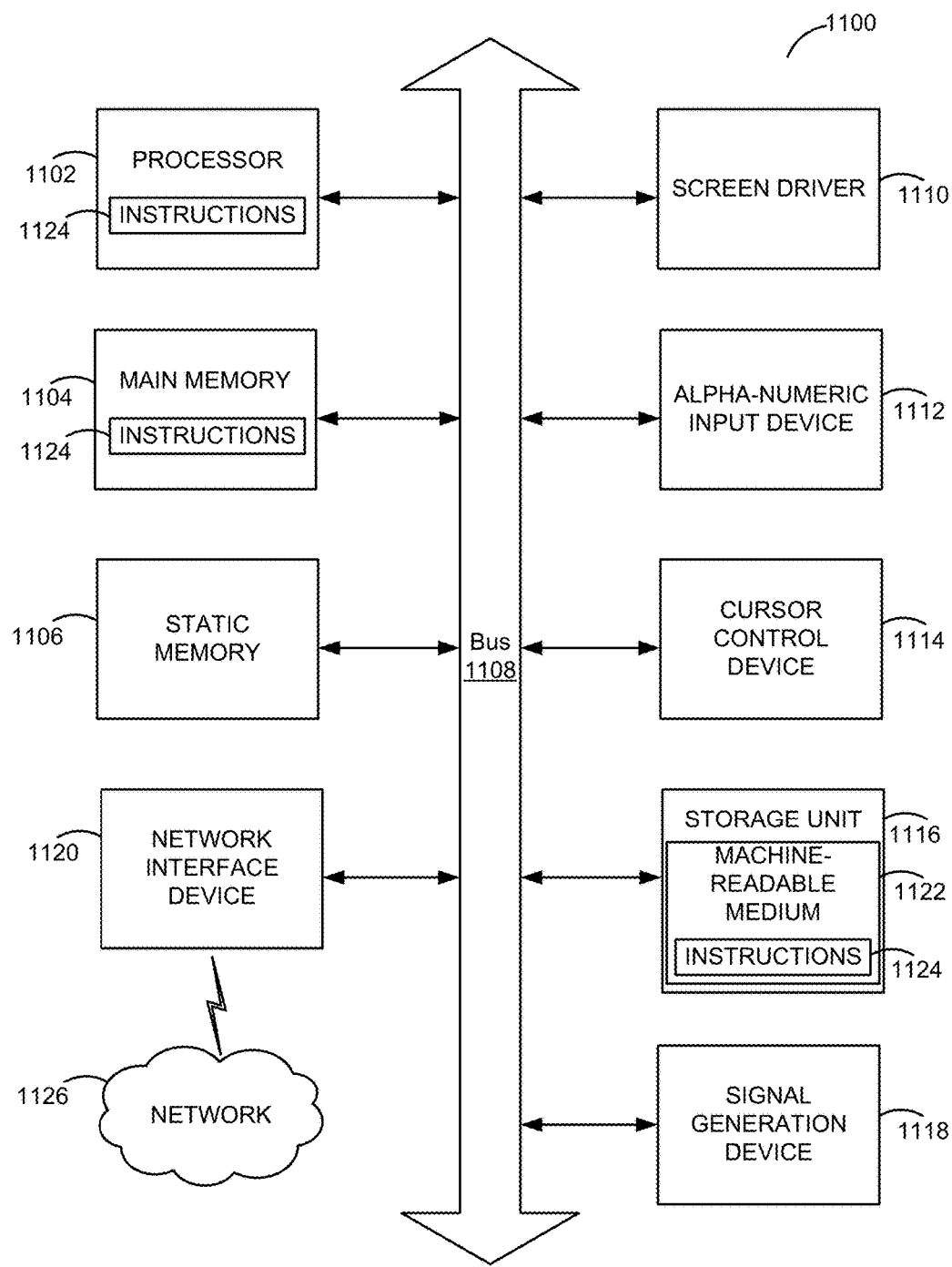
FIG. 11 is a block diagram illustrating components of an example machine able to read instructions from a machine-readable medium and execute them in a processor or controller.

FIG. 11 is a block diagram illustrating components of an example machine able to read instructions described as processes herein from a machine-readable medium and execute them in at least one processor (or controller). Specifically, FIG. 11 shows a diagrammatic representation of a machine in the example form of a computer system 1100. The computer system 1100 can be used to execute instructions 1124 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. It is noted the instructions correspond to the functionality of components and/or processes described herein, for example, with respect to FIGS. 1, 2, and 4-6. The instructions also may correspond to the processes associated with driving to the results shown in FIGS. 3A-3B, 7, 9, and 10A-10D.

The machine may be a server computer, a client computer, a personal computer (PC), a tablet PC, a set-top box (STB), a smartphone, an internet of things (IoT) appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes one or more processing units (generally processor 1102). The processor 1102 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1100 also includes a main memory 1104. The computer system may include a storage unit 1116. The processor 1102, memory 1104 and the storage unit 1116 communicate via a bus 1108.

In addition, the computer system 1100 can include a static memory 1106, a display driver 1110 (e.g., to drive a plasma display panel (PDP), a liquid crystal display (LCD), or a projector). The computer system 1100 may also include alphanumeric input device 1112 (e.g., a keyboard), a cursor control device 1114 (e.g., a mouse, a trackball, a joystick, a motion sensor, or other pointing instrument), a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium that is capable of storing instructions 1124 for execution by the machine and that cause the machine to perform any one or more of the methodologies disclosed herein. The term "machine-readable medium" includes, but not be limited to, data repositories in the form of solid-state memories, optical media, and magnetic media. It is noted that in some example embodiments, the core components of the computer system may disregard components except for the processor 1102, memory 1104, and bus 1108 and may in other embodiments also include the storage unit 1116 and/or the network interface device 1120.

Additional Considerations

The remote container analysis system as disclosed provides benefits and advantages that include the transformation of clusters of pixels into a digital representation of remote containers, and for each remote container, the digital representation of the roof, inner surfaces, and the filled volume of the remote container. Other advantages of the system include faster processing of the aerial images, less power consumption, lower latency in remote container detection, less data transmitted over the network, etc.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with FIGS. 1, 2, 4, 5, 6, and 11. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for a system and a process for identifying and determining the filled volume of remote containers from low resolution imagery through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:
1. A method for processing images from an aerial imaging device, comprising:
   receiving an image of an object of interest from the aerial imaging device;
   extracting, from the image of the object of interest, parameters describing at least an azimuth angle of the aerial imaging device;
   generating, from the parameters, idealized images of the object of interest comprising a top rim of the object of interest, an arc of a shadow on an inner surface of the object of interest, and a roof of the object of interest;
   matching the image of the object of interest to each idealized image to determine a filled volume of the object of interest; and
   transmitting information corresponding to the determined filled volume of the object of interest to a user device.
2. The method of claim 1, wherein the parameters further describe an elevation angle of the sun, an azimuth angle of the sun, and an elevation angle of the aerial imaging device.

3. The method of claim 1, wherein each idealized image corresponds to a distinct filled volume of the object of interest.

4. The method of claim 1, wherein the matching of the image of the object of interest to each idealized image comprises performing a dot product between pixels of the image of the object of interest and pixels of the idealized image.

5. A method for processing images from an aerial imaging device, the method comprising:
- extracting, from an image of an object of interest, parameters describing at least an azimuth angle of the aerial imaging device;
- generating, from the parameters, idealized images of the object of interest, wherein each idealized image corresponds to a distinct filled volume of the object of interest;
- matching the image of the object of interest to each idealized image to determine a filled volume of the object of interest; and
- transmitting information corresponding to the determined filled volume of the object of interest to a user device.

6. The method of claim 5, wherein the parameters further describe an elevation angle of the sun, an azimuth angle of the sun, and an elevation angle of the aerial imaging device.

7. The method of claim 5, wherein the generating of each idealized image comprises:
- generating circles corresponding to a top rim of the object of interest, an arc of a shadow on an inner surface of the object of interest, and a roof of the object of interest; and
- performing convolutions on the circles.

8. The method of claim 7, wherein the performing of the convolution comprises performing unions and intersections between the circles.

9. The method of claim 5, further comprising rescaling the image of the object of interest by:
- setting pixels corresponding to shadows and inner surfaces of the object of interest to negative values; and
- setting pixels corresponding to a roof of the object of interest to positive values.

10. The method of claim 5, wherein the matching of the image of the object of interest to each idealized image comprises:
- performing dot products between pixels of the image of the object of interest and pixels of the idealized image superimposed at different locations of the image of the object of interest; and
- determining a maximum value of the dot product across the different locations.

11. The method of claim 5, wherein the matching of the image of the object of interest to each idealized image comprises performing a dot product between pixels of an image gradient of the image of the object of interest and pixels of an outline of a top rim of the object of interest in the idealized image.

12. The method of claim 5, wherein the matching of the image of the object of interest to each idealized image comprises performing a dot product between pixels of an image gradient of the image of the object of interest and pixels of an outline of a shadow on an inner surface of the object of interest in the idealized image.

13. The method of claim 5, wherein the matching of the image of the object of interest to each idealized image comprises summing:
- a dot product between pixels of the image of the object of interest and pixels of the idealized image;
- a dot product between pixels of an image gradient of the image of the object of interest and pixels of an outline of a top rim of the object of interest in the idealized image; and
- a dot product between pixels of the image gradient and pixels of an outline of a shadow on an inner surface of the object of interest in the idealized image.

14. A non-transitory computer-readable storage medium comprising stored instructions executable by a processor, the instructions when executed by the processor cause the processor to:
- receive an image of an object of interest from the aerial imaging device;
- extract, from the image of the object of interest, parameters describing at least an azimuth angle of the aerial imaging devicegenerate, from the parameters, idealized images of the object of interest;
- match the image of the object of interest to each idealized image to determine a filled volume of the object of interest; and
- transmit information corresponding to the determined filled volume of the object of interest to a user device.

15. The non-transitory computer-readable storage medium of claim 14, wherein the instructions to generate each idealized image further comprise instructions that when executed cause the processor to:
- generate circles corresponding to a top rim of the object of interest, an arc of a shadow on an inner surface of the object of interest, and a roof of the object of interest; and
- perform convolutions on the circles.

16. The non-transitory computer-readable storage medium of claim 14, wherein the instructions to perform the convolution further comprise instructions that when executed cause the processor to perform unions and intersections between the three circles.

17. The non-transitory computer-readable storage medium of claim 14, wherein the instructions to match the image of the object of interest to each idealized image further comprise instructions that when executed cause the processor to:
- perform dot products between pixels of the image of the object of interest and pixels of the idealized image superimposed at different locations of the image of the object of interest; and
- determine a maximum value of the dot product across the different locations.

18. The non-transitory computer-readable storage medium of claim 14, wherein the instructions to match the image of the object of interest to each idealized image further comprise instructions that when executed cause the processor to perform a dot product between pixels of an image gradient of the image of the object of interest and pixels of an outline of a top rim of the object of interest in the idealized image.

19. The non-transitory computer-readable storage medium of claim 14, wherein the instructions to match the image of the object of interest to each idealized image further comprise instructions that when executed cause the processor to perform a dot product between pixels of an image gradient of the image of the object of interest and pixels of an outline of a shadow on an inner surface of the object of interest in the idealized image.

20. The non-transitory computer-readable storage medium of claim 14, wherein the instructions to match the image of the object of interest to each idealized image further comprise instructions that when executed cause the processor to sum:
- a dot product between pixels of the image of the object of interest and pixels of the idealized image;
- a dot product between pixels of an image gradient of the image of the object of interest and pixels of an outline of a top rim of the object of interest in the idealized image; and
- a dot product between pixels of the image gradient and pixels of an outline of a shadow on an inner surface of the object of interest in the idealized image.

* * * * *

UNITED STATES PATENT AND TRADEMARK OFFICE
CERTIFICATE OF CORRECTION

PATENT NO. : 10,319,107 B2
APPLICATION NO. : 15/880896
DATED : June 11, 2019
INVENTOR(S) : Babenko et al.

Page 1 of 1

It is certified that error appears in the above-identified patent and that said Letters Patent is hereby corrected as shown below:

In the Claims

Column 24, Claim 14, Lines 16-17, delete:
"imaging devicegenerate, from the parameters,"
And insert:
--imaging device;
generate, from the parameters,--

Signed and Sealed this
Fifth Day of May, 2020

Andrei Iancu
*Director of the United States Patent and Trademark Office*